United States Patent
Ness et al.

(10) Patent No.: US 8,474,943 B2
(45) Date of Patent: Jul. 2, 2013

(54) SECURE ACCESS TO FLUID CARTRIDGE MEMORY

(75) Inventors: Erik D. Ness, Vancouver, WA (US);
Kevin Bruce, Vancouver, WA (US);
Trudy Benjamin, Portland, OR (US);
Joseph M. Torgerson, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 375 days.

(21) Appl. No.: 12/867,822

(22) PCT Filed: Mar. 14, 2008

(86) PCT No.: PCT/US2008/057114
§ 371 (c)(1),
(2), (4) Date: Aug. 16, 2010

(87) PCT Pub. No.: WO2009/114019
PCT Pub. Date: Sep. 17, 2009

(65) Prior Publication Data
US 2010/0328405 A1 Dec. 30, 2010

(51) Int. Cl.
*B41J 29/393* (2006.01)
*B41J 2/175* (2006.01)

(52) U.S. Cl.
USPC .............................................. 347/19; 347/87

(58) Field of Classification Search
USPC ...................... 347/19, 50, 85, 86, 87; 711/202
See application file for complete search history.

(56) References Cited

U.S. PATENT DOCUMENTS

| | | | |
|---|---|---|---|
| 6,161,916 A | 12/2000 | Gibson et al. | |
| 6,435,676 B1 * | 8/2002 | Murray et al. | 347/87 |
| 6,588,872 B2 * | 7/2003 | Anderson et al. | 347/19 |
| 6,631,967 B1 * | 10/2003 | Saruta | 347/19 |
| 7,077,506 B2 | 7/2006 | Chen | |
| 7,195,346 B1 * | 3/2007 | Saruta et al. | 347/86 |
| 7,198,348 B2 | 4/2007 | Hu | |
| 2004/0181303 A1 | 9/2004 | Walmsley | |
| 2007/0154228 A1 | 7/2007 | Chan | |

FOREIGN PATENT DOCUMENTS

| | | |
|---|---|---|
| EP | 1004448 A2 | 5/2000 |
| WO | 02098669 | 12/2002 |
| WO | 2005070675 | 8/2005 |

* cited by examiner

*Primary Examiner* — Anh T. N. Vo

(57) ABSTRACT

An integrated fluid cartridge (100) for securing onboard memory (150, 215) includes an electrically actuated dispensing mechanism (120, 205) with a number of droplet generators which are fluidically connected to a fluid reservoir (110); a memory module (150, 215); and an electrical interface (200) containing shared select lines (250) and data lines (255) configured to control both the dispensing mechanism (120, 205) and the memory module (150, 215). A method for secure communications between a precision-dispensing device and integrated fluid cartridge (100) includes connecting the precision-dispensing device and the cartridge (100) via an electrical interface (200) containing select lines (250) and data lines (255); the cartridge (100) having several electronic components which are controlled via the select (250) and data lines (255).

20 Claims, 5 Drawing Sheets

SECURE ACCESS TO FLUID CARTRIDGE MEMORY

BACKGROUND

Printers and plotters often use integrated cartridges which contain an ink reservoir, an electrically actuated dispensing mechanism, and an electrical interface between the integrated cartridge and the printer. The electrical interface allows the printer to control the dispensing mechanism.

Advanced integrated cartridges may contain onboard memory which is accessible to the printer via the electrical interface. The onboard memory may contain a variety of information including the type of ink cartridge, the kind of ink contained in the cartridge, an estimate of the amount of ink remaining in the ink reservoir, calibration data, error information, and other data. The memory may also contain other proprietary or personal data. As the amount of information that can be stored on printer cartridges increases, the possibility of third party access to the interface and onboard memory becomes more undesirable.

Securing the cartridge memory and interface can be accomplished using secure memory chips or encryption techniques. However, using secure memory chips or encryption can significantly increase the cost of the printing system. The economics of manufacturing, distributing, and using disposable printer cartridges typically requires that relatively simple components and interfaces are used. These simple components and interfaces can allow a third party to easily observe how the interface works and recover data stored on the cartridge. The unsecured nature of the onboard memory and the printer/cartridge interface could compromise any proprietary or personal data stored in the cartridge memory.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
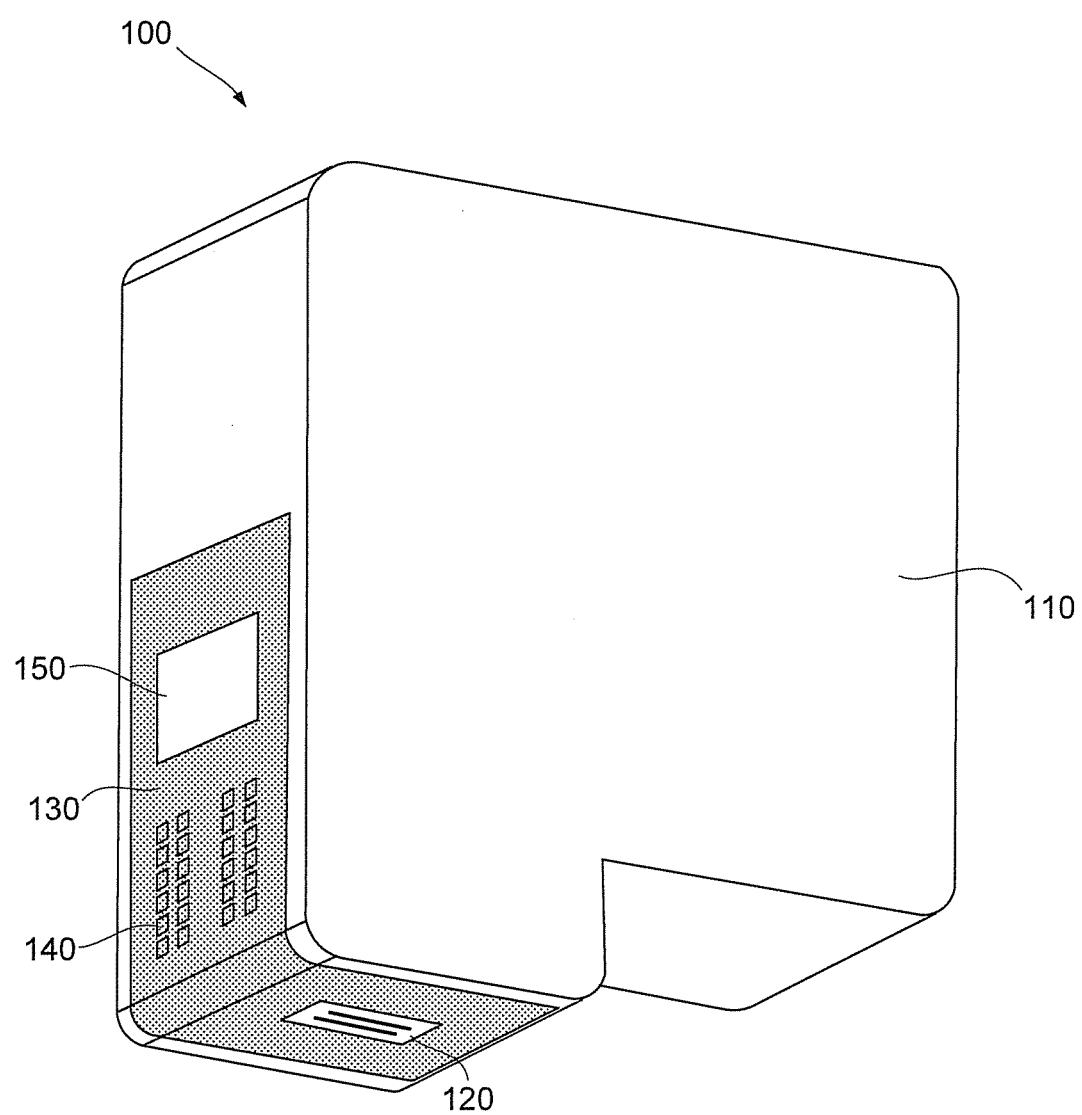
FIG. 1 is a perspective view of one illustrative print cartridge, according to one embodiment of the principles described herein.

Conventionally, data stored on print cartridges can be easily accessed by a third party due to the simple nature of the interface between the printer and cartridge. The third party observer can directly determine which bit in memory is being accessed because the address of the target memory bit is present throughout the read and write operations to memory. The control lines used to access memory are used only for that purpose, so there is little ambiguity as to the current task being performed on the interface. Also, the interfaces are digital interfaces where the meaning of a bit is easily determined and the timing of the circuit is predictable. This makes the interface of a print cartridge simple to reverse engineer and thus any data, including private user data, that is stored on the cartridge can be easily deciphered if a used or discarded print cartridge is obtained by a third party. By way of example and not limitation, private information which could be stored on print cartridge memory could include print job information, what kinds of print jobs were performed, page counts, rewards points, which printer or computer the ink cartridge was used in conjunction with, and other data.

One option to secure data that is stored on or transmitted to a print cartridge is through the use of data encryption. A variety of existing encryption methods could be implemented by including a secure chip on the cartridge. However, encryption can increase the cost of both the printer and print cartridge. In disposable cartridges, the cost of supporting encryption may be economically undesirable.

According to one exemplary embodiment, a low cost communication and storage method substantially increases the difficulty of third parties in eavesdropping on data transmitted between the printer and cartridge and accessing data stored in the cartridge memory. In one embodiment, an interface may share the use of the control lines between the different components of the cartridge circuitry, such as memory and the electrically-actuated dispensing mechanisms. A reduction in the number of control lines can reduce the cost and mechanical complexity of the devices, while simultaneously increasing the difficult for a third party in identifying the purpose of a given control signal. For example, if the same data and control lines direct the operation of both the ink dispensing mechanism and access to the onboard memory, differentiating between data read out of the memory and control data can become a non-trivial task because of the volume of data passing over the control and data lines.

The current specification describes a protocol where the current state depends on previous states and therefore requires a third party eavesdropper to record and interpret a series of commands to understand which bit in memory is being accessed. Additionally, the addressing procedures can be complex, making it difficult for an observer to determine which bit of the memory is being read from or written to. Precise timing can also be required in order to read from or write to the onboard memory, thereby making the simulation of the interface more difficult. Additional complexity may be included through the use of analog return signals whose levels vary from one printer cartridge to another.

Because there are often states or control line combinations that are unused, the printer can randomize the usage of the interface by periodically sending different signals that perform the same action. The generation of random numbers can be used to determine what signals to use. Additionally, memory bits can be read in different orders, further causing confusion to an observer as to what different bits mean and what actions are being performed over the interface.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

FIG. 1 is a perspective view of an illustrative print cartridge (100). The exemplary print cartridge (100) is more generally a fluid-jet precision-dispensing device or fluid ejector structure that precisely dispenses fluid, such as ink, as is described in more detail later in the detailed description. The exemplary print cartridge (100) illustrated in FIG. 1 is a single color ink cartridge for a fluid-jet printer. However, those of skill in the art will appreciate that the principles described herein may be implemented in any of a variety of fluid cartridges with on-board memory.

While the detailed description is at least substantially presented herein to inkjet-printing devices that eject ink onto media, those of ordinary skill within the art can appreciate that embodiments of the present disclosure are more generally not so limited. In general, embodiments of the present disclosure pertain to any type of fluid-jet precision-dispensing or ejection device that dispenses a substantially liquid fluid. A fluid-jet precision-dispensing device is a drop-on-demand device in which printing, or dispensing, of the substantially liquid fluid in question is achieved by precisely printing or dispensing in accurately specified locations, with or without making a particular image on that which is being printed or dispensed on. As such, a fluid-jet precision-dispensing device is in comparison to a continuous precision-dispensing device, in which a substantially liquid fluid is continuously dispensed therefrom. An example of a continuous precision-dispensing device is a continuous inkjet-printing device, for instance.

The fluid-jet precision-dispensing device precisely prints or dispenses a substantially liquid fluid in that the latter is not substantially or primarily composed of gases such as air. Examples of such substantially liquid fluids include inks in the case of inkjet-printing devices. Other examples of substantially liquid fluids include drugs, cellular products, organisms, chemicals, fuel, and so on, which are not substantially or primarily composed of gases such as air and other types of gases, as can be appreciated by those of ordinary skill within the art. Therefore, while the following detailed description is described in relation to an inkjet printhead structure that ejects ink onto media, those of ordinary skill within the art will appreciate that embodiments of the present disclosure more generally pertain to any type of fluid-jet precision-dispensing device or fluid ejection structure that dispenses a substantially liquid fluid as has been described in this paragraph and the preceding paragraph.

Thus, for purposes of explanation, a print cartridge or ink cartridge will be described. However, it will be understood that any type of fluid or liquid cartridge may be used with the principles described herein. Specifically, the term "fluid cartridge" will refer to any cartridge dispensing a liquid on a drop-on-demand basis. Additionally, the term "fluid-jet" will refer to a device that selectively jets a liquid or fluid from a fluid cartridge on a drop-on-demand basis. A print or ink cartridge dispensing liquid ink is thus only one example of a fluid cartridge as defined herein.

According to one exemplary embodiment, the ink cartridge (100) is comprised of an ink reservoir (110), a fluid-jet die (120), a flexible cable (130), conductive pads (140), and a memory chip (150). The flexible cable (130) is adhered to two sides of the ink cartridge (100) and contains traces that electrically connect the memory (150) and fluid-jet die (120) with the conductive pads (140).

The ink cartridge (100) is typically installed into a cradle that is integral to the carriage of a printer. When the ink cartridge is correctly installed, the conductive pads (140) are pressed against corresponding electrical contacts in the cradle, allowing the printer to communicate with, and control the electrical functions of, the ink cartridge. For example, the conductive pads (140) allow the printer to access and write to the fluid-jet memory chip (150).

The memory chip (140) may contain a variety of information including the type of ink cartridge, the kind of ink contained in the cartridge, an estimate of the amount of ink remaining in the ink reservoir (110), calibration data, error information, and other data. The printer can take appropriate action based on the information contained in the ink cartridge memory (140), such as notifying the user that the ink supply is low or altering printing routines to maintain image quality. In the illustrated embodiment, the cartridge memory (140) is shown as a separate element that is distinct from the ink jet die (120). However, according to one exemplary embodiment, the ink jet die (120) may contain the memory in addition to the means for dispensing the ink.

To create an image, the printer moves the carriage containing the ink cartridge over a piece of print medium. At appropriate times, the printer sends electrical signals to the fluid-jet cartridge (100) via the electrical contacts in the cradle. The electrical signals pass through the conductive pads (140) and are routed through the flexible cable (130) to the fluid-jet die (120). The fluid-jet die (120) then ejects a small droplet of ink from the reservoir (110) onto the surface of the print medium. These droplets combine to form an image on the print medium surface.

Figure 2:
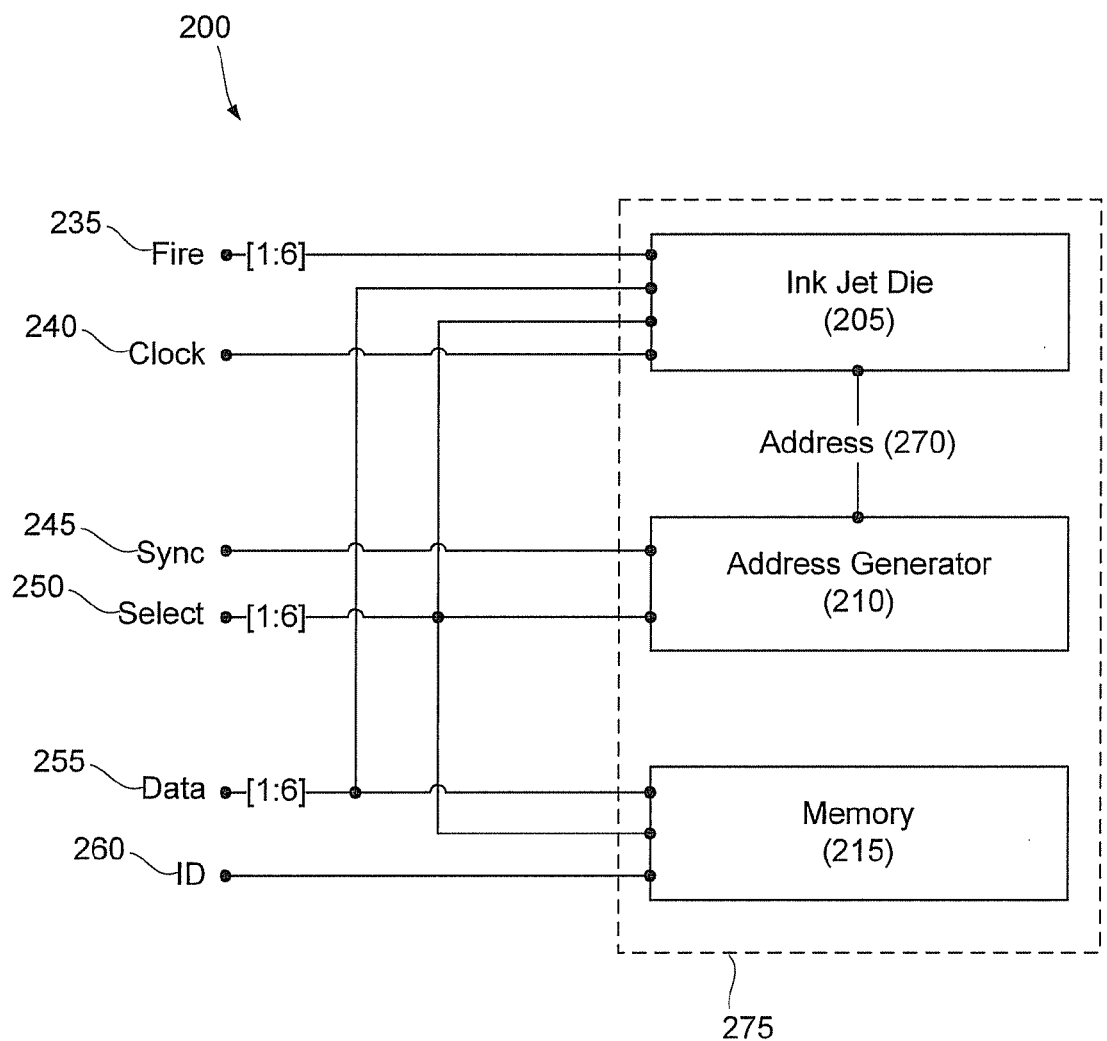
FIG. 2 is a diagram of an illustrative electrical interface of a print cartridge, according to one embodiment of the principles described herein.

FIG. 2 is a diagram of an illustrative electrical interface (200) for a print cartridge (100, FIG. 1). According to one exemplary embodiment, the input and output lines (235-260) represent the electrical connections between the printer and the cartridge (100, FIG. 1) which are made via the conductive pads (140, FIG. 1) on the flexible circuit (130, FIG. 1). The functional diagram (200) is not meant to depict all the necessary inputs, outputs or electrical components which may be included in a cartridge (100, FIG. 1), but is meant to give a general depiction of the cartridge functionality as it relates to on-cartridge memory (140).

The input and output lines (235-260) are separated into groups according to common functionality. The fire lines (235) consist of multiple lines (fire lines 1 through 6) which are used to control the firing of fluid-jets for the deposit of ink on the print medium. The sync line (245) is a single line that is used, in part, to synchronize operations between the printer and cartridge. The select lines (250) consist of multiple lines (select lines 1 through 6) which are used to select bit addresses in the memory (215) and to control firing processes in the fluid-jet die (205). The data lines (255) consist of multiple lines (data lines 1 through 6) which may be used for data transfer between the printer and the cartridge (100, FIG. 1). The ID line (260) can be used to both read from and write to memory bits within the memory (215).

According to one exemplary embodiment, the clock line (240) is a single line that oscillates at a high frequency to provide a timing reference for the internal electrical functions of the fluid-jet die (205). In alternative embodiments, a clock line (240) may not be required. Instead, the select lines (250) may perform the functions substantially similar to a clock line.

The fluid-jet die (205) contains fluidic and electronic components that control the ejection of droplets onto print media. According to one exemplary embodiment, the fluid-jet die (205) is comprised of a plurality of droplet generators. Each droplet generator is comprised of a firing chamber in fluidic connection with the ink reservoir (110, FIG. 1), a heater element adjacent to the firing chamber, and a nozzle through which ink droplets are ejected. Ink enters the firing chamber from the reservoir (110, FIG. 1) and is ejected out of the firing chamber through the nozzle.

To fire a droplet from a droplet generator, the address generator component (210) receives data over the select lines (250) and generates an address for the desired droplet generator. The clock line (240) and the data lines (255) trigger the firing of the selected droplet generator for the correct time and desired duration. An electrical current passes through one or more of the firing lines (235) to the heater element adjacent to the selected firing chamber. The heater element causes a small portion of the ink to vaporize, creating a bubble inside the firing chamber. As the bubble expands, a droplet of ink is ejected out of the nozzle. Following the ejection cycle, the electrical current is cut off from the heater element. The vapor bubble collapses, drawing additional ink into the firing chamber. In some designs, the droplet ejection frequency for a single droplet generator can be as high as 30 kHz. Typically, a fluid-jet die (205) will contain a plurality of droplet generators, resulting in a considerable amount of control data being passed over the select lines (250), data lines (255) and the firing lines (235).

The memory module (215) represents a memory array and the accompanying circuitry used to select memory locations. The select lines (250) are used in conjunction with the data lines (255) to initiate and drive addressing procedures. An ID line (260) is connected to the memory module (215) and is used to both read data from the array and to write data onto the array.

According to one exemplary embodiment, the memory (215), the address generator (210), and the ink jet die (205) are part of the same silicon chip (175). The combination of all the circuitry (205, 210, 215) contained in the ink cartridge into a single chip (175) can provide significant cost and integration savings. However, if memory (270) is integrated into the same chip as the ink jet die (205), the requirements and processes used in the creation of the droplet generators may restrict the kinds of memory which can be formed on the chip.

Figure 3:
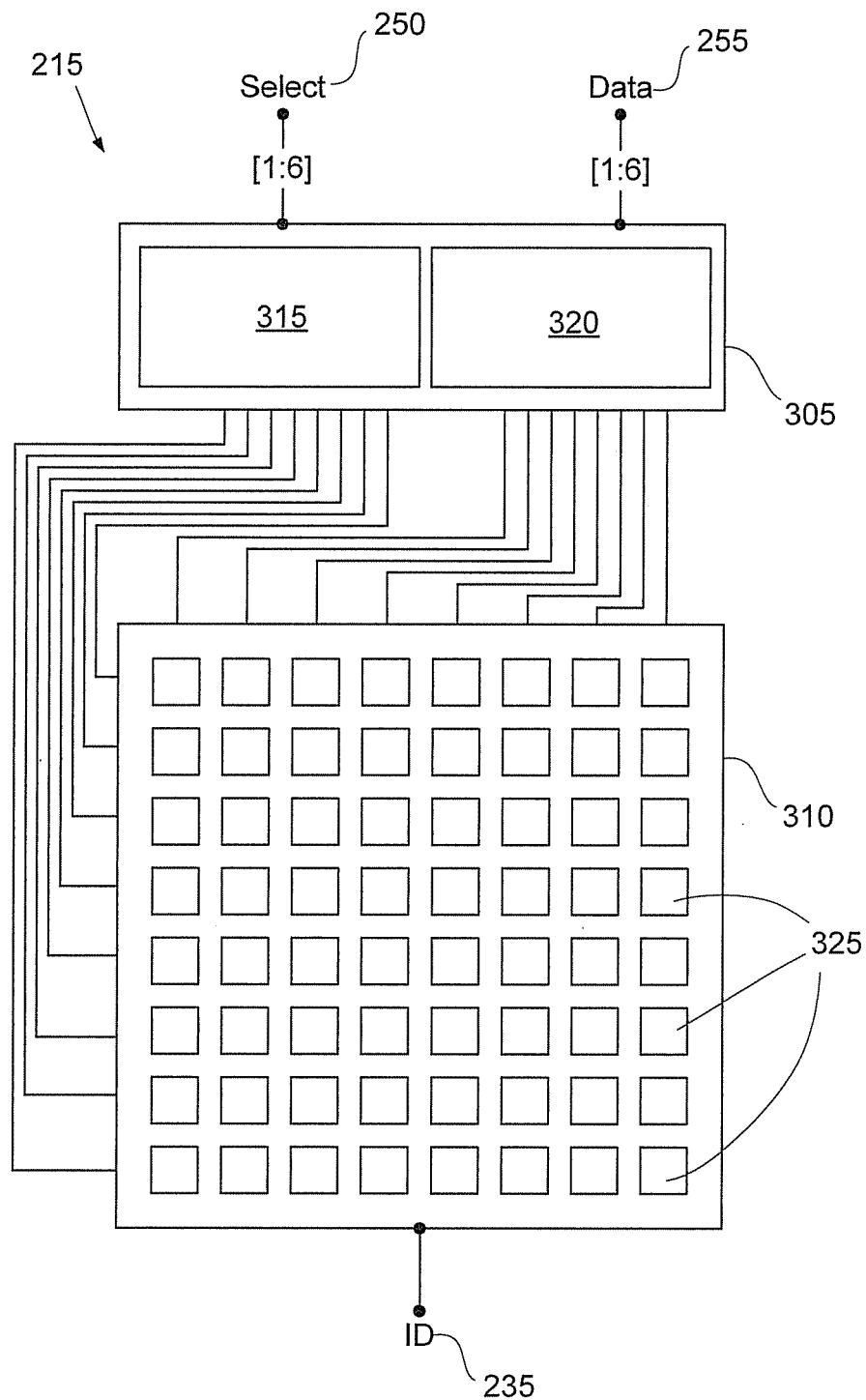
FIG. 3 is a diagram of an illustrative memory module, according to one embodiment of the principles described herein.

In FIG. 3, a diagram of an exemplary memory module (215) is shown. The memory module (215) comprises a memory array (310) and addressing circuitry (305). The memory array (310) is comprised of a number of nonvolatile memory elements (325) where information can be stored. According to one illustrative embodiment, the memory array (310) may comprise an eight by eight array of these memory elements (325), making a total number of 64 bits. The memory bits (325) may be any type of memory that retains data after electrical power is removed, such as EPROM (Erasable Programmable Read Only Memory), EEPROM (Electrically Erasable Programmable Read Only Memory) or fusible links. The memory array (310) could be much larger, but for illustrative purposes, only an eight by eight array is shown.

According to an alternative embodiment, the total memory amount could also be increased using multiple memory arrays with a common addressing scheme. Where two memory banks are used, additional methods of securing the information could be used. By way of example and not limitation, a high bit resistance in a first bank could correspond to a digital "1" while a high bit resistance in a second bank could correspond to a digital "0".

The type of memory used can depend on a variety of factors including cost of the memory, the performance requirements, the size of the memory, and if read/write memory is required. For example, a manufacturer may desire that the bits are one-time writeable, meaning after a memory bit is programmed it cannot be erased or overwritten. The memory (310) is read or written via the ID line (235) which may be a single line that is able to read or write a single bit at a time.

According to one exemplary embodiment, the memory address generation circuitry (305) can be comprised of a column shift register (320) and a row shift register (315). These two registers (315, 320) are driven by the select lines (245). The data line (240) may be used to set bits of the registers to desired values and initiate addressing procedures. The shift registers (315, 320) may vary greatly in their size or configuration. For illustrative purposes, a simple configuration is shown which has a column register (320) having the same number of registers as there are columns of memory bits and a row register (315) having the same number of bits as there are rows of memory bits. This configuration is used in relation to this embodiment and leads to each register (315; 320) having a length of eight bits.

Figure 4:
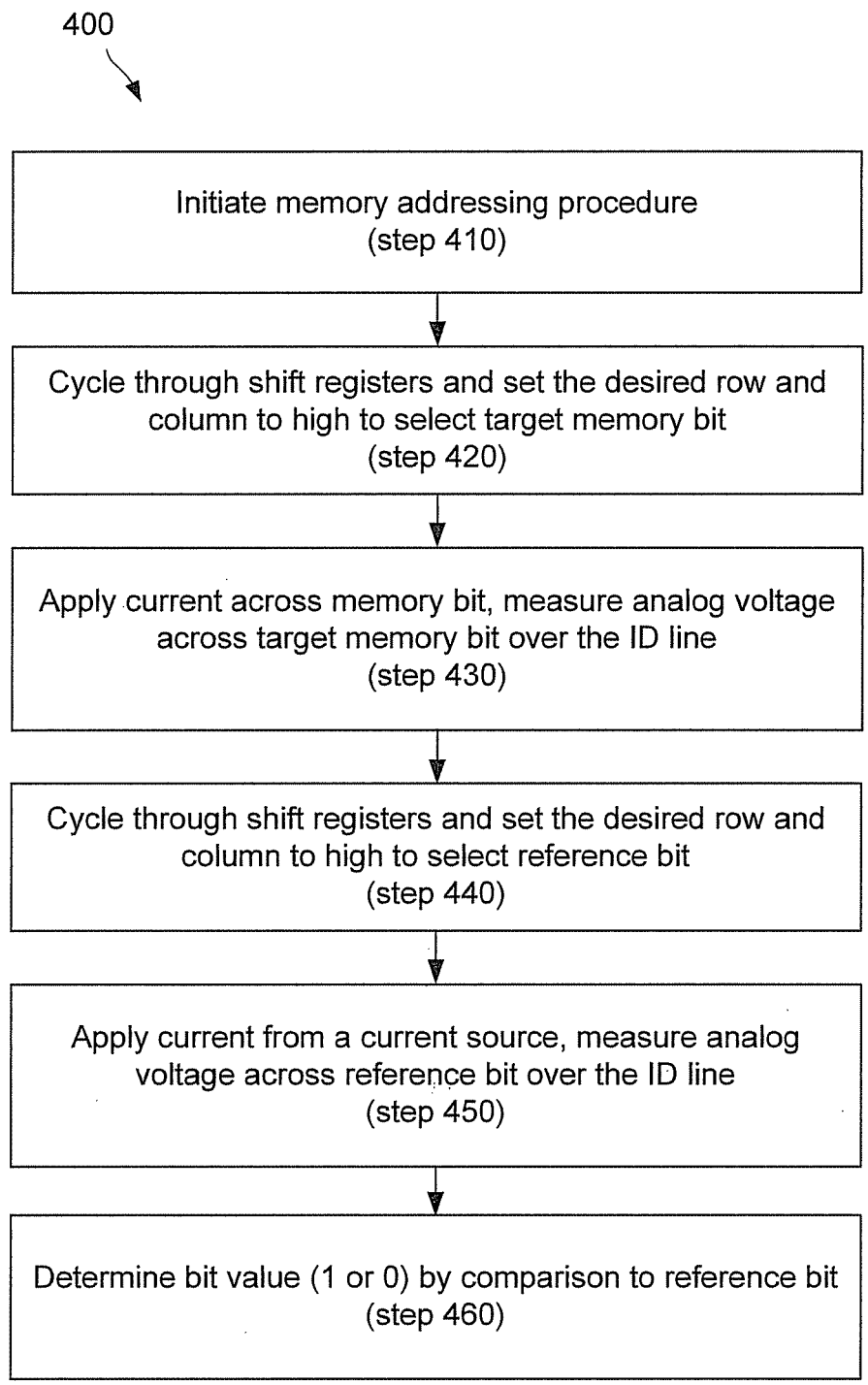
FIG. 4 is a flowchart showing an illustrative method of reading is data from a print cartridge memory, according to one embodiment of the principles described herein.

FIG. 4 is a flowchart (400) showing an illustrative method for reading a memory bit (325, FIG. 3) from the memory module (215, FIG. 2). The read process begins with the initiation of the addressing procedure (step 410). The process may be initialized by a certain combination of input signals over the select line (250, FIG. 3) and/or data lines (255, FIG. 3). For example, the circuitry could begin the addressing procedure when the first data line (240, FIG. 3) and the first select line (245, FIG. 3) are both high.

After initialization, the memory address generator (305, FIG. 3) is cycled through each address bit in the bit registers (step 420). According to one exemplary embodiment, the select lines (250, FIG. 3) are used to drive the is shift registers (305, FIG. 3) through various stages and the data lines (255, FIG. 3) are used to set the address bits. For example, the select lines (315, FIG. 3) may sequentially be set high. This sequential cycle through the select lines (250, FIG. 3) causes the register values to advance to the next register stage. Because there are 16 address bits (eight bits in each register), the address generator needs to cycle through 16 times. Each cycle, the data line (255, FIG. 3) may be used to set each stage of the shift registers to its proper value.

To select a single memory bit in this configuration, a single row and a single column are selected. Thus, after 16 cycles of the address generator, one address bit of the column shift register (320, FIG. 3) will be high and the remainder will be set low. Correspondingly, one address bit of the row shift register (315, FIG. 3) will be high and the rest low. This will select a single memory bit of the 64 bits (325, FIG. 3) in the array.

The dual roles of the data and select lines in combination with the complexity of the addressing procedure can make it more difficult for an eavesdropper to extract meaningful information from the printer/cartridge interface. For example, the process of reading from the memory module (215, FIG. 2) could be seamlessly integrated into the operation of the firing chambers in the fluid-jet die (205, FIG. 2). Both operations are performed using the same data (255, FIG. 2) and select lines (250, FIG. 2). The eavesdropper is faced with a high frequency stream of control signals where the control and data signals associated with reading from the memory module (215, FIG. 2) blend into the overall flood of data.

Once the addressing is completed, the printer can now read from the memory element (325, FIG. 2) by applying a current across the element and measuring the analog voltage produced across the element (step 430). This resulting analog voltage is sensed by the printer over the ID line (235, FIG. 2).

According to one exemplary embodiment, the timing of the read may need to be very precise. For example, there may be a short window of time during which the read process (step 430) may occur because the values stored in the shift register will be lost outside of that time period. If an attempt is made to read the bit value outside of the correct time window, the shift registers will have lost the address of the memory element. After the time window, the voltage value on the ID line (235, FIG. 2) may be inaccurate or corrupt. By way of example and not limitation, the ID line voltage could drift or access a random bit within the array. Without knowledge of the precise timing required to read the memory array, an eavesdropper could be unable to consistently ascertain the actual voltage value associated with the bit.

After the resulting voltage is measured, the printer cycles through the address registers as described above to select the address of a reference element (step 440). The reference element is selected and read in the same manner as described above. A current is applied across the reference element and the resulting voltage is read over the ID line (step 450). The reference bit value may be read at any time during the write process, or may be read less frequently and stored in the memory of the printer.

The printer then compares the voltage level of the target memory element to the voltage level of the reference element (step 440). By comparing the reference bit to the measured bit, the printer will interpret the measured bit as a "1" or a "0."

There can be several reasons for utilizing a reference bit. During the lithographic manufacturing process, it is comparatively easy to manufacture all of the resistor elements in a memory array with a substantially similar resistance, but difficult to manufacture the bits to a specified absolute resistance value. Thus, the absolute values of bit resistances between various cartridges could vary widely. The variation in the resistance can cause the analog voltage output over the ID line (235, FIG. 3) to vary widely between cartridges.

According to one exemplary embodiment, the EPROM bits are programmed by selecting a bit from the array and then applying a relatively high voltage across the bit. The voltage allows a portion of the electrons to be permanently captured by the floating gate. The capture of electrons by the floating gate is essentially an analog process, with varying numbers of electrons being captured by a given bit. To read an EPROM bit, a constant current is passed through the bit and through a reference resistor. A voltage is measured across the reference resistor and output through the ID line. To appropriately scale the analog voltage level so that a digital "1" or "0" can be obtained, the measured analog voltage is compared to a reference voltage from a reference bit within the array. If the analog voltage is substantially equal to or greater than the reference voltage, the target bit may represent a digital "1". If the analog voltage is substantially lower than the reference voltage the target bit may represent a digital "0".

In an alternative embodiment, fusible links may be used as memory elements. The fusible links may be programmed by addressing a link in the array and then passing a relatively high current through the link. The high current elevates the temperature of the link and alters its resistive characteristics. After programming the bits in an array, the "low" bits may have a permanent shift in resistance. For example, the "low" bit may have a resistance of 80% of the initial resistance value.

To allow the printer to measure only the resistance difference generated by programming, the resistance of a reference resistor is measured. The difference between the reference bit value and the programmed resistor value is a meaningful measurement that allows the printer to interpret the bit as a "1" or a "0".

The method of making differential measurements between a reference bit and a target bit can be used to protect the integrity of the printer/cartridge interface. The reference bit could be any one of the bits within the memory array. Further, the reference bit could be read at any time during a session. An eavesdropper connected to the ID line (235, FIG. 3) would be presented with a series of varying analog voltages with no method of determining which analog voltage represents the reference bit resistance. Further, the analog voltages could vary widely between printer cartridges because of manufacturing variations in the resistances of the memory array. If multiple memory components or memory banks are included on the cartridge, a different reference bit may be used in relation to each bank. Each bank would have a different voltage threshold for the analog voltages read from the memory elements. This could further protect the data and interface from interference or eavesdropping by third parties by making the analog voltages more difficult to translate into digital information.

Figure 5:
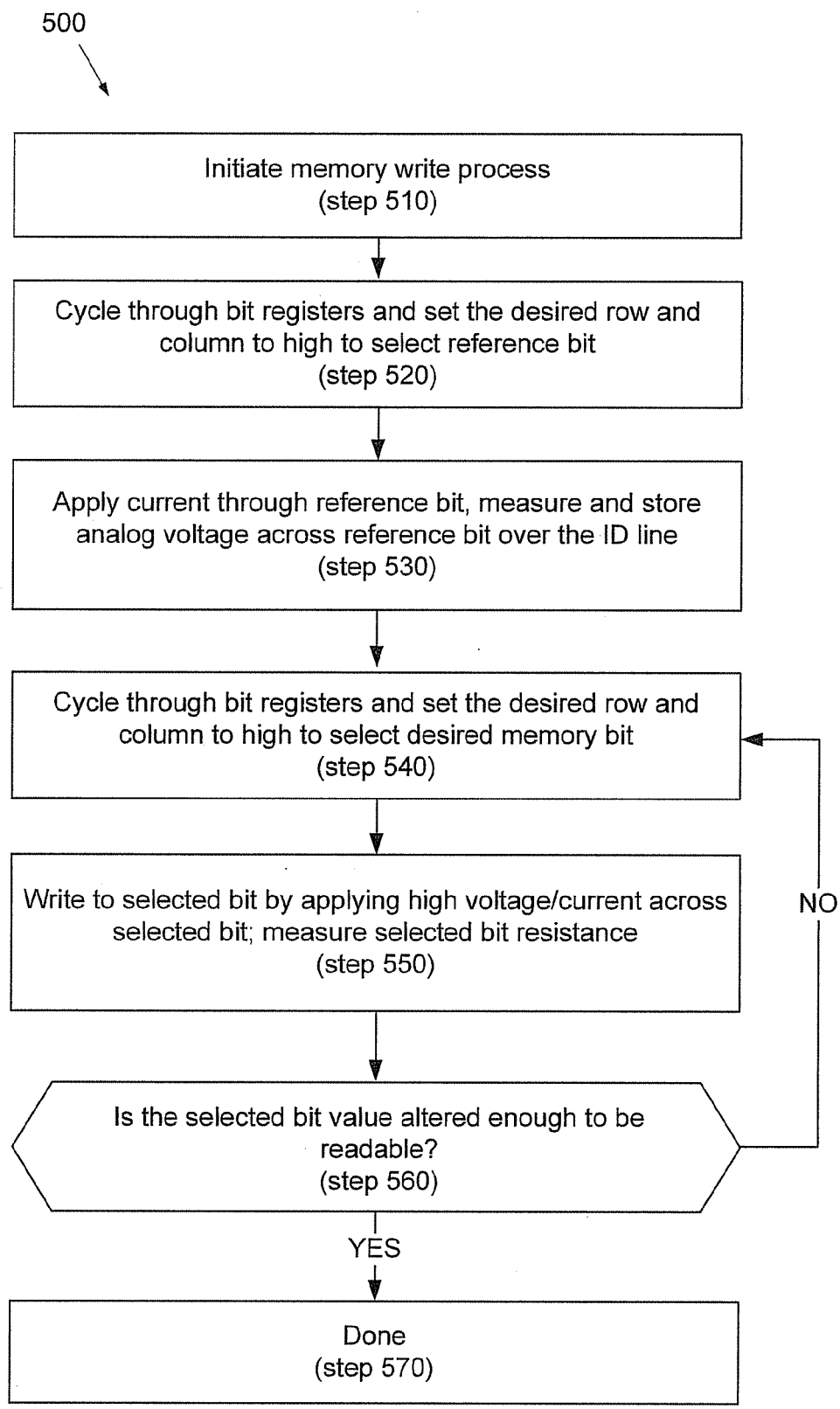
FIG. 5 is a flowchart showing an illustrative method of writing data to a print cartridge memory, according to one embodiment of the principles described herein.

FIG. 5 is a flowchart showing an illustrative method to write to print cartridge memory. The write process may begin identically to the read process in that the addressing process is first initialized (510). Then, the select lines (245, FIG. 3) and data lines (240, FIG. 3) may be used in the same manner as discussed in relation to FIG. 4 to set the desired row and column address bits high for selection of a reference bit (step 520). A current is applied through the reference bit and the resulting voltage across the reference bit is measured and stored in the printer (step 530).

The addressing procedure is repeated to select the memory bit which is to be written (step 540). Once the addressing procedure is finished, the selected memory bit can be written by passing a high voltage/current across the selected memory bit (step 550). Again, the time period during which the memory bit (325, FIG. 3) can be written may be limited to a narrow window of time. According to one exemplary embodiment, the desired value may be written to memory via the ID line (235, FIG. 3). After the selected bit has been written, the resistance of the selected bit is measured to determine if the write process has sufficiently altered the properties of the selected bit to render it readable. As described above, the measurement process requires addressing the selected bit and applying a current through the selected bit, then measuring the voltage across the selected bit via the ID line. The measured voltage is compared to the voltage measured across the reference bit. If the resistance of the select bit is within predefined tolerances that define a readable bit, the writing process is complete (step 570). However, if the selected bit has not been altered enough by the writing process to be readable, the writing process is repeated.

To further protect the interface from eavesdropping by a third party, the printer firmware may randomize usage of the interface. For example, during the process of initializing a read or write procedure (410, FIG. 4; 510, FIG. 5) the printer may set additional bits high besides those required to initiate the addressing procedure. Then, even if the observer is able to determine that the initialization process occurred, they may not be able to identify which select or data signals are required to begin the read or write process. The process of introducing random obscurations into the interface can be used in relation to other procedures and may be used to give the appearance of some other process occurring than the actual process that is being performed.

Additional complexities can be introduced in the firmware. For example, when the printer needs to access a series of bits from memory for a process, it may access the bits in different orders at different times, making it very difficult to determine the meaning of the bits. The randomization of these processes may be done, for example, via random number generation methods.

In sum, the combination of complexity, addressing procedures, variable bit values, precise timing required for read/write operations, and integration of memory data in a larger data flow can decrease the likelihood that a third party eavesdropper can extract personal or proprietary information from a print cartridge memory. This level of security is obtained without any substantial increase in component costs because the majority of the security results from utilizing relatively inexpensive components in a manner that more effectively protects on-cartridge data.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. An integrated fluid cartridge (100) comprising:
an electrically actuated dispensing mechanism (120, 205), said dispensing mechanism (120, 205) comprising a plurality of droplet generators, said droplet generators being fluidically connected to a fluid reservoir (110);
a memory module (150, 215);
an electrical interface (200), said electrical interface comprising a number of control lines (260), a number of select lines (250), and a number of data lines (255);
in which said electrical interface (200) is configured to allow access by a printing device to said dispensing mechanism (120, 205) and said memory module (150, 215); and
in which said number of data lines (255) and said number of select lines (250) are shared by said dispensing mechanism (120, 205) and said memory module (150, 215) to read from said memory module (150, 215) and actuate said dispensing mechanism (120, 205).

2. The integrated fluid cartridge (100) of claim 1, further comprising an address generator (210), said address generator (210) receiving data over said number of select lines (250) and generating an address, said address identifying a droplet generator within said dispensing mechanism (120, 205).

3. The integrated fluid cartridge (100) of claim 2, wherein said memory module (150, 215) comprises a memory element array (310) and a shift register (315, 320), said shift register (315, 320) being connected to said number of select lines (250) and said number of data lines (255), said shift register (315, 320) being configured to allow access to individual memory elements (325) within said memory element array (310).

4. The integrated fluid cartridge (100) of claim 3, wherein said element array (310) contains a reference element, said reference element having a measurable reference voltage when current is applied across the reference element.

5. The integrated fluid cartridge (100) of claim 4, wherein said printer measures an output voltage of a first memory element (325) within said memory element array (310) when current is applied across the first memory element; said printer comparing said output voltage of said first memory element with said reference voltage to produce a binary digit.

6. The integrated fluid cartridge (100) of claim 5, wherein said shift register (315, 320) maintains said address for a limited time period, said measurement of said measurement of output voltage of said first memory element occurring within said limited time period.

7. The integrated fluid cartridge (100) of claim 6, wherein said shift register (315, 320) comprises a plurality of stages, each of said stages corresponding to column or row of said memory array (310).

8. The integrated fluid cartridge (100) of claim 7, wherein a memory element (325) is addressed within said memory array (310) by asserting a logical signal over a first data line (255) of said number of data lines (225) and sequentially cycling through said number of select lines (250) to advance said shift register (315, 320) through said plurality of stages.

9. A method for secure communications between a printer and integrated fluid cartridge (100) comprising:
connecting said integrated fluid cartridge (100) to said printer via an electrical interface (200), said integrated fluid cartridge (100) comprising a dispensing means and a memory module (150, 215);
wherein said electrical interface (200) comprises a number of select lines (250) and a number of data lines (255), said number of select lines (250) and said number of data lines (255) being connected to both of said dispensing means and said memory module (150, 215);
controlling said dispensing means via said number of select lines (250) and said number of data lines (255) such that fluid is dispensed from said integrated fluid cartridge (100); and
controlling said memory module (150, 215) via said number of select lines (250) and said number of data lines (255) such that data can be written to and read from memory elements (325) contained in said memory module (150, 215).

10. The method of claim 9, wherein said data read from said memory elements (325) is an analog voltage.

11. The method of claim 10, wherein said memory module (150, 215) contains a reference element (325), said reference element (325) producing a measurable reference voltage; said analog voltage being compared to said reference voltage to produce a binary digit.

12. The method of claim 9, wherein data signals passed over said number of select lines (250) and said number of data lines (255) to control said dispensing means and said memory module (150, 215) are merged into a command data stream that controls said dispensing means.

13. The method of claim 9, wherein said memory module (150, 215) contains a shift register (315, 320), said shift register (315, 320) being connected to said number of serial lines and a first data line (255) of said number of data lines (255), wherein said shift register (315, 320) comprises a plurality of stages, each of said stages corresponding to column or row of said memory array (310).

14. The method of claim 13, further comprising accessing a memory element (150, 215) by asserting a logical signal over said first data line (255) and sequentially cycling said number of select lines (250) to advance said shift register (315, 320) through said stages, said logical signal being stored in said stages such that a row and a column corresponding to said memory element (150, 215) are set to an upper logical value.

15. The method of claim 14, further comprising reading said memory element (150, 215) by passing a current through a said memory element (150, 215) and reading a resulting analog voltage.

16. The method of claim 15, further comprising comparing said resulting analog voltage to a reference voltage to produce a binary value.

17. The method of claim 16, wherein said reading said memory element (150, 215) is performed within a short time period, said short time period being substantially equal to a time period during which said shift registers (315, 320) maintain said row and said column at said upper logical value.

18. The method of claim 17, wherein signals passed over said electrical interface are randomized.

19. The method of claim 18, wherein said memory elements (150, 215) within said memory array (310) are accessed in a random order or non-sequential pattern.

20. A method for securing on-cartridge data comprising:
   connecting a printer to an integrated print cartridge (100) via an electrical interface (200), said integrated print cartridge (100) comprising a dispensing means and a memory module (150, 215) wherein said electrical interface (200) comprises number of select lines (250) and number of data lines (255), said number of select lines (250) and said number of data lines (255) being connected to both of said dispensing means and said memory module (150, 215);
   controlling said dispensing means via said number of select lines (250) and said number of data lines (255) such that ink is dispensed from said integrated printer cartridge (100);
   controlling said memory module (150, 215) via said number of select lines (250) and said number of data lines (255), said memory module (150, 215) containing a shift register (315, 320), said shift register (315, 320) being connected to said number of serial lines and said number of data lines (255), wherein said shift register (315, 320) comprises a plurality of stages, each of said stages corresponding to column or row of said memory array (310);
   accessing a memory element (150, 215) by asserting a logical signal over a first data line (255) of said number of data lines (255) and sequentially cycling said number of select lines (250) to advance said shift register (315, 320) through said stages, said logical signal being stored in said stages such that a row and a column corresponding to said memory element (150, 215) are set to an upper logical value;
   reading said memory element (150, 215) by passing a current through said memory element (150, 215) and reading a resulting analog voltage; wherein said reading said memory element is performed within a short time period, said short time period being substantially equal to a time that said shift registers (315, 320) maintain said row and said column at said upper logical value; and
   comparing said analog voltage with a reference voltage to produce a binary digit, said binary digit representing a logical value of said memory element (150, 215);
   wherein said data signals passed over said number of select lines (250) and said number of data lines (255) to control said dispensing means and said memory module (150, 215) are merged into a continuous data stream.

\* \* \* \* \*